Patented Nov. 21, 1933

1,936,266

UNITED STATES PATENT OFFICE 1,936,266

MONOAZO-DYESTUFFS AND THEIR PRODUCTION

Bernhard Richard, Basel, Switzerland, assignor to firm J. R. Geigy S. A., Basel, Switzerland No Drawing. Application October 22, 1932, Serial No. 639,152, and in Switzerland November 2, 1931

6 Claims. (Cl. 260—92)

By this invention valuable dyestuffs suitable for dyeing wool and silk are made by combining a diazo compound of an amine of the general formula:

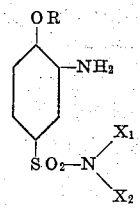

wherein R represents an aromatic radical and $X_1$ and $X_2$ represent hydrogen or are the one an alkyl, the other a radical of the benzene series, with an arylsulpho-(N)- or benzoyl-(N)-derivative of a 1-amino-8-hydroxynaphthalenedisulphonic acid. The new dyestuffs dye wool and silk in beautiful red shades; besides good fastness to fulling and light they have a particularly good fastness towards sea-water, in which respect they are superior to the dyestuffs described in German specification No. 235,775.

The new dyestuffs have the following general formula:

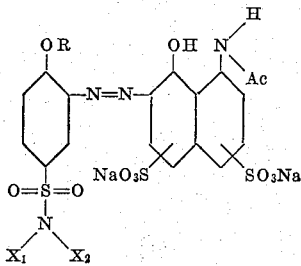

wherein R represents an aromatic radical, $X_1$ and $X_2$ represent the same or different aliphatic, araliphatic or aromatic radicals or hydrogen and Ac an arylsulpho- or benzoylgroup.

The following example illustrates the invention:

36.8 kilos of 2-amino-diphenylether-4-sulphonic acid-N-ethylanilide (a white crystalline product of melting point 112° C. which can be obtained by treating 2-nitrochlorobenzene-4-sulphochloride with monoethylaniline, condensing with sodium phenolate the 2-nitrochlorobenzene-4-sulphonic acid-N-ethylanilide thus obtained and reducing the condensation product by means of iron) are diazotized and the diazo solution is allowed to run at 0° C. into an aqueous solution of 47.3 kilos of paratoluenesulpho-1-amino-8-hydroxynaphthalene-3:6-disulphonic acid containing an excess of sodium acetate, whilst well stirring. The reaction mixture is neutralized by the gradual addition of a solution of sodium carbonate. When coupling is complete the whole is heated and the dyestuff is salted out, filtered and dried.

The dyestuff thus obtained is a red powder which is soluble in water to a vivid red solution and in concentrated sulphuric acid to a dull blue-red solution. It dyes wool and silk very clear red shades of very good fastness to light and fulling and of excellent fastness to sea-water.

Quite similar dyestuffs are obtained if instead of 2-amino-diphenylether-4-sulphonic acid-N-ethylanilide there is used, for example, 2-amino-diphenylether-sulphonamide, 2-amino-diphenylether-sulphonanilide, 2-amino-diphenylether-sulphonorthotoluidide or 2-amino-2'-methyl-diphenylether-4-sulphonanilide.

Instead of paratoluenesulpho-(N)-1-amino-8-hydroxy-naphthalene-3:6-disulphonic acid there may be used, for example, benzene-sulpho(N)-1-amino-8-hydroxynaphthalene-3:6-disulphonic acid or paratoluene-sulpho(N)- or benzene-sulpho (N)-1-amino-8-hydroxynaphthalene-4:6-disulphonic acid.

Dyestuffs having the same valuable properties and having a somewhat bluer shade are obtained if instead of an aryl-sulphon(N)-1-amino-8-hydroxynaphthalene-disulphonic acid there is used a benzoyl(N)-1-amino-8-hydroxynaphthalene-disulphonic acid.

What I claim is:

1. A process for the manufacture of monoazo-dyestuffs, consisting in coupling a diazo-compound of an amine of the general formula:

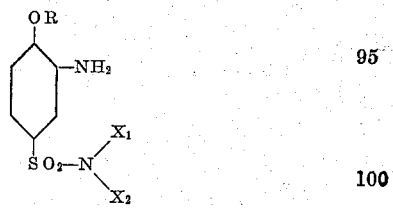

wherein R represents an aromatic radical of the benzene series and $X_1$ and $X_2$ represent hydrogen or are the one an alkyl, the other a radical of the benzene series, with an acidyl-(N)-derivative of a 1-amino-8-hydroxynaphthalene-disulphonic acid, wherein acidyl represents an arylsulpho or a benzoyl group.

2. A process for the manufacture of monoazo-dyestuffs, consisting in coupling a diazo-compound of an amine of the general formula:

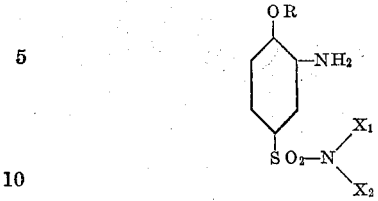

wherein R represents an aromatic radical of the benzene series and $X_1$ and $X_2$ represent hydrogen or are the one an alkyl, the other a radical of the benzene series, with an arylsulpho-(N)-derivative of a 1-amino-8-hydroxynaphthalene-disulphonic acid.

3. A process for the manufacture of monoazo-dystuffs, consisting in coupling a diazo-compound of an amine of the general formula:

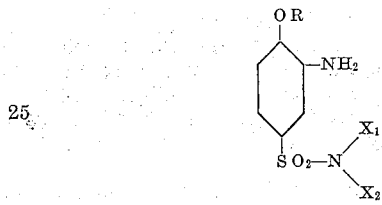

wherein R represents an aromatic radical of the benzene series and $X_1$ and $X_2$ represent hydrogen or are the one an alkyl, the other a radical of the benzene series, with a benzoyl-(N)-derivative of a 1-amino-8-hydroxynaphthalene-disulphonic acid.

4. A process for the manufacture of monoazo-dyestuffs, consisting in coupling diazotized 2-amino-diphenylether-4-sulphonic acid-(N)-ethylanilide with paratoluene-sulpho-1-amino-8-hydroxynaphthalene-3:6-disulphonic acid.

5. The monoazo-dyestuffs corresponding with the following general formula:

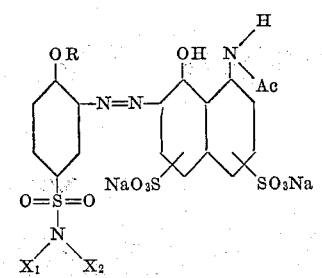

wherein R represents an aromatic radical of the benzene series, $X_1$ and $X_2$ represent hydrogen or are the one an alkyl, the other a radical of the benzene series, and Ac an arylsulpho- or benzoylgroup, said dyestuffs dyeing wool and silk in beautiful red shades of good fastness to fulling and light as well as towards sea-water.

6. The reaction product from diazotized 2-amino-diphenylether-4-sulphonic acid-(N)-ethylanilide and para-toluene-sulpho-1-amino-8-hydroxynaphthalene-3:6-disulphonic acid, having the following formula:

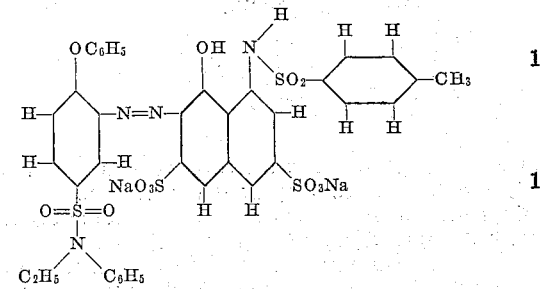

BERNHARD RICHARD.